US009154052B2

(12) United States Patent
Fujikawa et al.

(10) Patent No.: US 9,154,052 B2
(45) Date of Patent: Oct. 6, 2015

(54) POWER INVERTER CIRCUIT HAVING SWITCHING ELEMENTS

(71) Applicants: Sumitomo Electric Industries, Ltd., Osaka-shi (JP); National University Corporation TOYOHASHI UNIVERSITY OF TECHNOLOGY, Toyohashi-shi (JP)

(72) Inventors: Kazuhiro Fujikawa, Osaka (JP); Satoshi Hatsukawa, Osaka (JP); Nobuo Shiga, Osaka (JP); Takashi Ohira, Toyohashi (JP)

(73) Assignees: Sumitomo Electric Industries, Ltd., Osaka-shi (JP); National University Corporation TOYOHASHI UNIVERSITY OF TECHNOLOGY, Toyohashi-shi (JP)

( * ) Notice: Subject to any disclaimer, the term of this patent is extended or adjusted under 35 U.S.C. 154(b) by 271 days.

(21) Appl. No.: 13/852,805

(22) Filed: Mar. 28, 2013

(65) Prior Publication Data
US 2013/0279229 A1 Oct. 24, 2013

Related U.S. Application Data

(60) Provisional application No. 61/635,552, filed on Apr. 19, 2012.

(30) Foreign Application Priority Data

Apr. 19, 2012 (JP) ................................ 2012-095308

(51) Int. Cl.
H02M 7/5387 (2007.01)
(52) U.S. Cl.
CPC ................................. H02M 7/53871 (2013.01)
(58) Field of Classification Search
CPC ... H02M 7/003; H02M 7/538; H02M 7/5387; H02M 7/53871; Y02B 70/1441
USPC ............ 363/16, 17, 20, 21.06, 21.09, 37, 40, 363/41, 55, 56.02, 58, 87, 95, 97, 98, 109, 363/120, 132, 131, 136
See application file for complete search history.

(56) References Cited

U.S. PATENT DOCUMENTS 6,075,717 A * 6/2000 Kumar et al. .................... 363/87
8,243,009 B2 * 8/2012 Nishinosono ................. 345/102

FOREIGN PATENT DOCUMENTS

| JP | 19910236004 | * | 9/1991 | ............. H02M 7/48 |
| JP | 5-083984 A | | 4/1993 | |
| JP | 6-215882 A | | 8/1994 | |
| JP | 2003-088130 A | | 3/2003 | |

OTHER PUBLICATIONS

International Preliminary Report on Patentability and Written Opinion in counterpart PCT International Application No. PCT/JP2013/058342, dated Oct. 30, 2014.
International Search Report and Written Opinion issued in PCT International Application No. PCT/JP2013/058342 dated Jun. 18, 2013.
Imai, Koji, "Power Electronics Handbook," R&D Planning Co., Ltd., Feb. 20, 2002, pp. 328-337.

* cited by examiner
(Continued)

Primary Examiner — Adolf Berhane
Assistant Examiner — Yemane Mehari
(74) Attorney, Agent, or Firm — Venable LLP; Michael A. Sartori; Trent B. Ostler

(57) ABSTRACT

A power inverter circuit 1 is a bridge power inverter circuit comprising first and second switching elements 11, 12 sequentially connected in series between input terminals on higher and lower voltage sides and third and fourth switching elements 13, 14 sequentially connected in series between the input terminals on the higher and lower voltage sides and alternately turning on a set of the first and fourth switching elements 11, 14 and a set of the second and third switching elements 12, 14 so as to convert a DC power fed between the input terminals on the higher and lower voltage sides into an AC power. One of the sets of the first and third switching elements 11, 13 and the second and fourth switching elements 12, 14 is subjected to switching control at a frequency higher than that of the other.

2 Claims, 6 Drawing Sheets

POWER INVERTER CIRCUIT HAVING SWITCHING ELEMENTS

CROSS-REFERENCE TO RELATED APPLICATION

This application claims priority to Provisional Application No. 61/635,552 filed on Apr. 19, 2012 and claims the benefit of Japanese Patent Application No. 2012-095308 filed on Apr. 19, 2012, all of which are incorporated herein by reference in their entirety.

TECHNICAL FIELD

The present invention relates to a bridge power inverter circuit which converts a DC power into an AC power.

BACKGROUND

As a power inverter circuit which converts a DC power into an AC power, bridge inverters have been known widely. As bridge inverters of this kind, Non Patent Literature 1 discloses single- and three-phase inverters.

A single-phase bridge inverter comprises first and second switching elements sequentially connected in series between input terminals on higher and lower voltage sides and third and fourth switching elements sequentially connected in series between the input terminals on the higher and lower voltage sides. By alternately turning on a set of the first and fourth switching elements and a set of the second and third switching terminals, the single-phase bridge inverter generates a single-phase AC power between an intermediate node of the first and second switching elements and an intermediate node of the third and fourth switching elements (e.g., FIGS. 6 and 9 of Non Patent Literature 1).

On the other hand, a three-phase bridge inverter comprises first and second switching elements sequentially connected in series between input terminals on higher and lower voltage sides, third and fourth switching elements sequentially connected in series between the input terminals on the higher and lower voltage sides, and fifth and sixth switching elements sequentially connected in series between the input terminals on the higher and lower voltage sides. By periodically turning on a set of the first and fourth switching elements, a set of the third and sixth switching elements, and a set of the fifth and second switching elements with a phase difference of a ⅓ cycle therebetween, the three-phase bridge inverter generates a three-phase AC power among an intermediate node of the first and second switching elements, an intermediate node of the third and fourth switching elements, and an intermediate node of the fifth and sixth switching elements (e.g., FIGS. 7 and 10 of Non Patent Literature 1).

Non Patent Literature 1 also discloses a bridge inverter which performs switching control by using a pulse width modulation (PWM) scheme during a period when the switching elements in each set are on (e.g., FIG. 13 of Non Patent Literature 1).

Non Patent Literature 1: IMAI Koji, *Power Electronics Handbook* (R & D Planning Co., Ltd., February, 2002), p. 328-337

SUMMARY

This kind of bridge power inverter circuit necessitates four and six switching elements in single- and three-phase types, respectively. Such a bridge power inverter circuit performs switching control of all the switching elements at the same frequency. This makes it necessary for all the switching elements to use switching elements which can operate at relatively high speed, whereby lower cost is hard to attain.

It is therefore an object of the present invention to provide a power inverter circuit which can lower its cost.

The power inverter circuit in accordance with the present invention is a bridge power inverter circuit comprising first and second switching elements, sequentially connected in series between input terminals on higher and lower voltage sides, having an intermediate node connected to a first output terminal; and third and fourth switching elements, sequentially connected in series between the input terminals on the higher and lower voltage sides, having an intermediate node connected to a second output terminal; the power inverter circuit alternatively turning on a set of the first and fourth switching elements and a set of the second and third switching elements so as to convert a DC power fed between the input terminals on the higher and lower voltage sides into an AC power between the first and second output terminals; wherein one of the sets of the first and third switching elements and the second and fourth switching elements is subjected to switching control at a frequency higher than that of the other.

By switching control of one of the sets of the first and third switching elements and the second and fourth switching elements at a frequency higher than that of the other, the power inverter circuit can use switching elements which operate at relatively low speed and are less expensive as the switching elements in the other set. Therefore, this power inverter circuit can achieve lower cost.

Meanwhile, there is a case where a CMOSFET (Complementary Metal Oxide Semiconductor Field Effect Transistor) is used as a switching element in a bridge circuit. That is, there is a case where a PMOSFET (P-channel Metal Oxide Semiconductor Field Effect Transistor) is used for the first and third switching elements on the upper arm side, while an NMOSFET (N-channel Metal Oxide Semiconductor Field Effect Transistor) is used for the second and fourth switching elements on the lower arm side. The CMOSFET is advantageous in that it is easier to be driven by a clock signal, but is disadvantageous in that the PMOSFET tends to exhibit an operating speed lower than that of the NMOSFET, thereby making it hard to attain higher speed in switching control.

It is therefore preferable for the power inverter circuit that the set of the second and fourth switching elements be subjected to switching control at a frequency higher than that of the set of the first and third switching elements.

In this case, the second and fourth switching elements on the lower arm side are subjected to switching control at a frequency higher than that of the first and third switching elements, which is suitable when using the CMOSFET as a switching element, whereby both of rapidness in switching control and easiness in driving the switching element can be obtained at the same time.

Preferably, in the power inverter circuit, the first switching element is turned on while the fourth switching element is subjected to switching control using a pulse width modulation scheme in a half-cycle period of the AC power when the first and fourth switching elements are on, and the third switching element is turned on while the second switching element is subjected to switching control using a pulse width modulation scheme in the other half-cycle period of the AC power when the second and third switching elements are on.

Preferably, in the power inverter circuit, the first switching element is subjected to switching control using a pulse width modulation scheme while the fourth switching element is subjected to switching control using a pulse width modulation scheme at a frequency at least twice as high as the switching frequency of the first switching element in a half-cycle period of the AC power when the first and fourth switching elements are on, and the third switching element is subjected to switching control using a pulse width modulation scheme while the second switching element is subjected to switching control using a pulse width modulation scheme at a frequency at least twice as high as the switching frequency of the third switching element in the other half-cycle period of the AC power when the second and third switching elements are on.

Preferably, in the power inverter circuit, the first to fourth switching elements are subjected to switching control so as to generate a single-phase AC power between the first and second output terminals. This makes it possible to achieve a low-cost, full-bridge single-phase inverter circuit.

Preferably, the power inverter circuit further comprises fifth and sixth switching elements, sequentially connected in series between the input terminals on the higher and lower voltage sides, having an intermediate node connected to a third output terminal; wherein the first to sixth switching elements are subjected to switching control such that one of sets of the first, third, and fifth switching elements and the second, fourth, and sixth switching elements is subjected to switching control at a frequency higher than that of the other so as to generate a three-phase AC power among the first to third output terminals. This makes it possible to achieve a low-cost, bridge three-phase inverter circuit.

The present invention can achieve lower cost in bridge power inverter circuits.

BRIEF DESCRIPTION OF THE DRAWINGS

FIG. 2 is a diagram illustrating an equivalent circuit of the inverter in accordance with the first embodiment during a period when its first switching element is on;

FIG. 3 is a diagram illustrating an equivalent circuit of the inverter in accordance with the first embodiment during a period when its third switching element is on;

FIG. 4 is a diagram illustrating the output voltage of the inverter in accordance with the first embodiment during the period when the first switching element is on;

DETAILED DESCRIPTION

Figure 1:
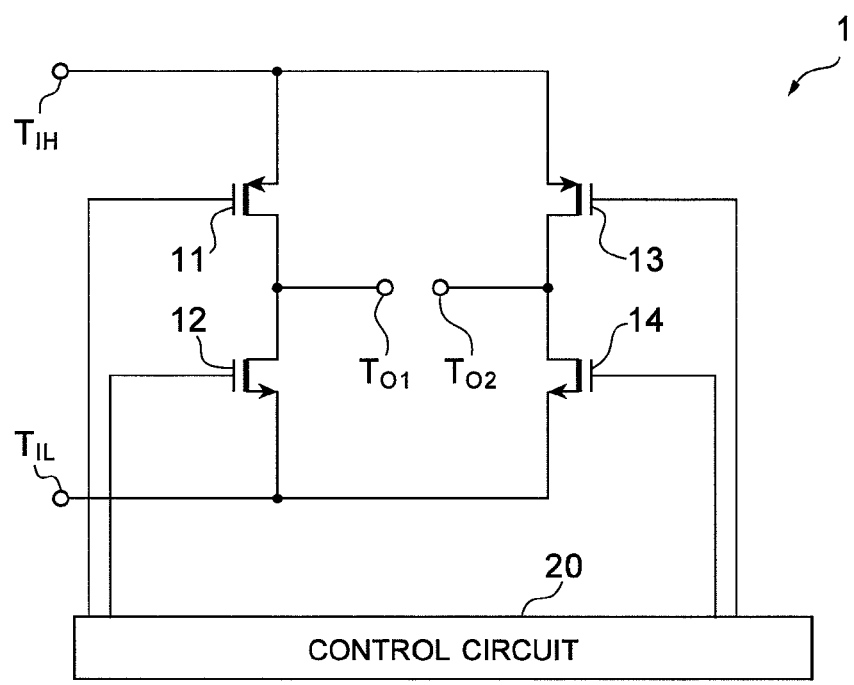
FIG. 1 is a circuit diagram illustrating a single-phase full-bridge inverter in accordance with a first embodiment of the present invention.

In the following, preferred embodiments of the present invention will be explained in detail with reference to the drawings. In the drawings, the same or equivalent parts will be referred to with the same signs.

First Embodiment

FIG. 1 is a circuit diagram illustrating the inverter in accordance with the first embodiment of the present invention. The inverter (power inverter circuit) 1 of the first embodiment is a single-phase full-bridge inverter. The inverter 1 converts a DC power fed between a higher-voltage-side input terminal $T_{IH}$ and a lower-voltage-side input terminal $T_{IL}$ into a single-phase AC power between first and second output terminals $T_{O1}$, $T_{O2}$. The inverter 1 comprises first to fourth switching elements 11 to 14 and a control circuit 20.

The first and second switching elements 11, 12 are sequentially connected in series between the higher- and lower-voltage-side input terminals $T_{IH}$, $T_{IL}$, while their intermediate node is connected to the first output terminal $T_{O1}$. For example, the first switching element 11 on the upper arm side is a PMOSFET, while the second switching element 12 on the lower arm side is an NMOSFET.

More specifically, the first switching element 11 has a source terminal connected to the higher-voltage-side input terminal $T_{IH}$ and a drain terminal connected to a drain terminal of the second switching element 12. The second switching element 12 has a source terminal connected to the lower-voltage-side input terminal $T_{IL}$. The drain terminals of the first and second switching elements 11, 12 are connected to the first output terminal $T_{O1}$. The first and second switching elements 11, 12 have gate terminals connected to the control circuit 20.

Similarly, the third and fourth switching elements 13, 14 are sequentially connected in series between the higher- and lower-voltage-side input terminals $T_{IH}$, $T_{IL}$, while their intermediate node is connected to the second output terminal $T_{O2}$. For example, the third switching element 13 on the upper arm side is a PMOSFET, while the fourth switching element 14 on the lower arm side is an NMOSFET.

More specifically, the third switching element 13 has a source terminal connected to the higher-voltage-side input terminal $T_{IH}$ and a drain terminal connected to a drain terminal of the fourth switching element 14. The fourth switching element 14 has a source terminal connected to the lower-voltage-side input terminal $T_{IL}$. The drain terminals of the third and fourth switching elements 13, 14 are connected to the second output terminal $T_{O2}$. The third and fourth switching elements 13, 14 have gate terminals connected to the control circuit 20.

The control circuit 20 performs switching control of the first to fourth switching elements 11 to 14. Specifically, the control circuit 20 alternately turns on a set of the first and fourth switching elements 11, 14 and a set of the second and third switching elements 12, 13, so as to convert a DC current fed between the higher- and lower-voltage-side input terminals $T_{IH}$, $T_{IL}$ into a single-phase AC power between the first and second output terminals $T_{O1}$, $T_{O2}$.

More specifically, in a half-cycle period of the output single-phase AC power when the first and fourth switching elements 11, 14 are on, the control circuit 20 turns on the first switching element 11, while subjecting the fourth switching element 14 to switching control using a pulse width modulation (PWM) scheme. In the other half-cycle period of the output single-phase AC power when the second and third switching elements 12, 13 are on, the control circuit 20 turns on the third switching element 13, while subjecting the second switching element 12 to switching control using the PWM scheme.

That is, the control circuit 20 subjects the first and third switching elements 11, 13 on the upper arm side to switching control at the frequency of the output AC power and the second and fourth switching elements 12, 14 on the lower arm side to switching control at a frequency higher than that of the first and third switching elements 11, 13 by using the PWM scheme.

Operations of the inverter 1 in accordance with the first embodiment will now be explained. For example, suppose that the first and third switching elements 11, 13 are controlled such as to be alternately turned on/off at a low speed (e.g., at a frequency of 60 Hz). Then, the fourth switching element 14 is subjected to PWM control at a high speed (e.g., at a frequency of 120 Hz) during a period when the first switching element 11 is on, and the second switching element 12 is subjected to PWM control at a high speed (e.g., at a frequency of 120 Hz) during a period when the third switching element 13 is on.

Figure 2:
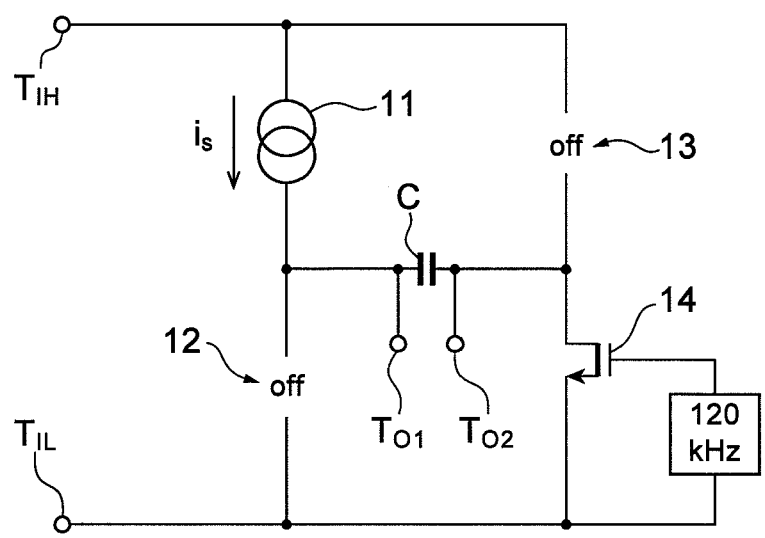
Figure 3:
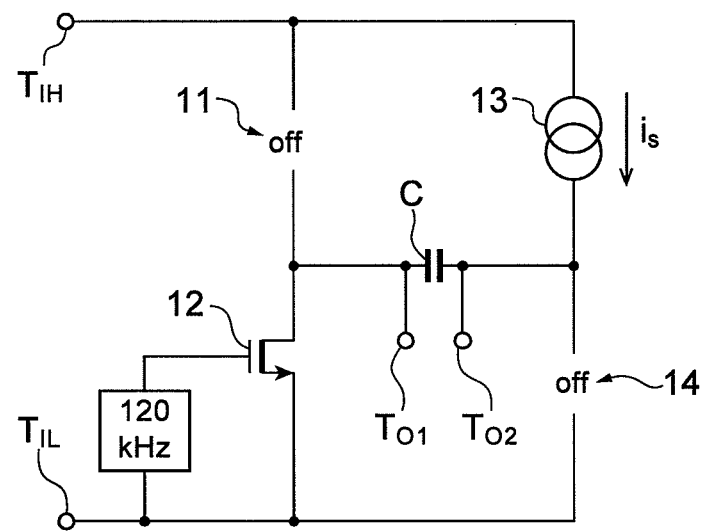

FIG. 2 is a diagram illustrating an equivalent circuit of the inverter 1 during a period when the first switching element 11 is on, while FIG. 3 is a diagram illustrating an equivalent circuit of the inverter 1 during a period when the third switching element 13 is on. For ease of the following explanations of operations, a smoothing capacitor (capacity value C) is supposed to be connected between the first and second output terminals $T_{O1}$, $T_{O2}$. A resistance load (resistance value R) is assumed to be connected between the first and second output terminals $T_{O1}$, $T_{O2}$. In FIGS. 2 and 3, $i_s$ is the saturation current value of each of the first and third switching elements 11, 13.

Figure 4:
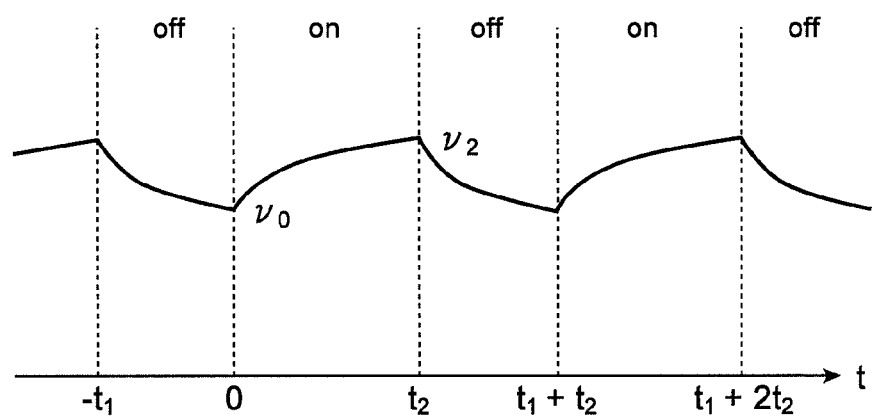

FIG. 4 is a diagram illustrating the output voltage of the inverter 1 during the period when the first switching element 11 is on. Using a time at which the fourth switching element 14 switches from off to on as the origin, the off and on times are defined as $t_1$ and $t_2$, respectively, in FIG. 4. That is, one cycle of on-off switching is $t_1+t_2$.

Figure 5:
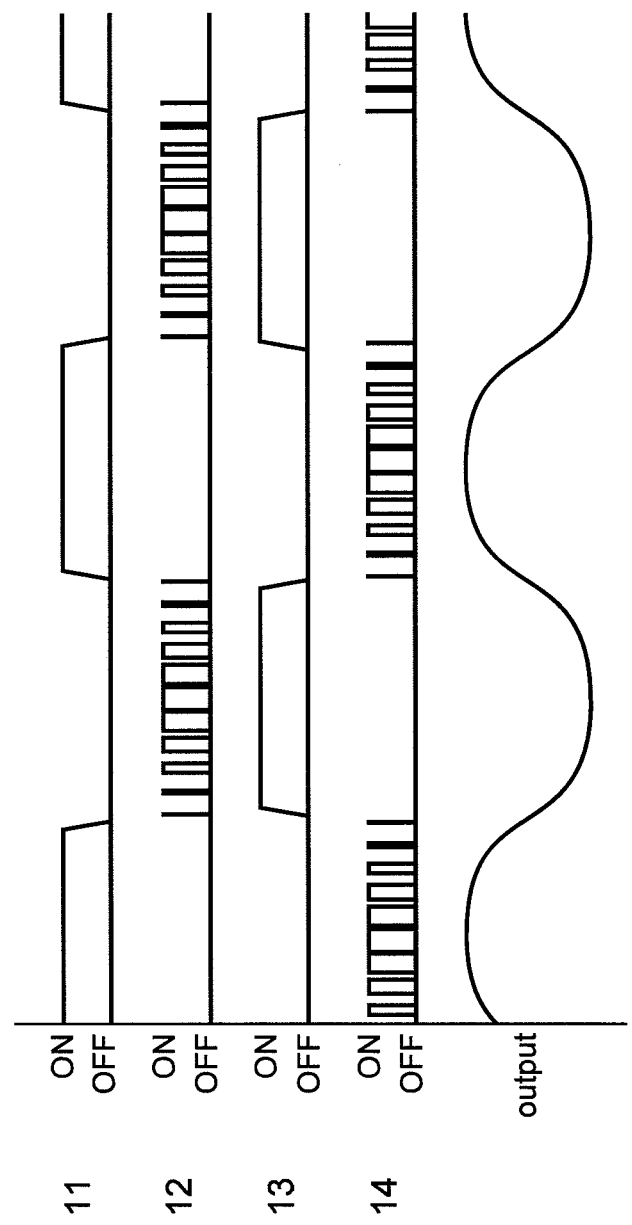
FIG. 5 is a diagram illustrating the output AC voltage of the inverter in accordance with the first embodiment.

FIG. 5 is a diagram illustrating the output voltage of the inverter 1. FIG. 5 also illustrates the on and off states of the first to fourth switching elements 11 to 14.

First, during a period when the first switching element 11 is on, the second and third switching elements 12, 13 are held in the off state as illustrated in FIGS. 2 and 5. The fourth switching element 14 is subjected to PWM control at 120 kHz, for example.

Assuming that the output voltage v(t) of the inverter 1 is a function of time t, the following expressions (1) and (2) are obtained according to Kirchhoff's current law during respective periods when the fourth switching element 14 is off and on.

[Math. 1]

$$\frac{v(t)}{R} + C\frac{dv(t)}{dt} = 0 \qquad (1)$$

$$\frac{v(t)}{R} + C\frac{dv(t)}{dt} = i_s \qquad (2)$$

Here, as mentioned above, C is the capacity value of the smoothing capacitor, R is the resistance value, and $i_s$ is the saturation current value of the first switching element 11.

The above-mentioned expressions (1) and (2) are first-order linear ordinary differential equations, whose general solutions are determined as the following expressions (3) and (4), respectively.

[Math. 2]

$$v(t) = v_0 e^{-\sigma t} \qquad (3)$$

$$v(t) = Ri_s + v_1 e^{-\sigma t} \qquad (4)$$

Here, $\sigma$ is the voltage decay constant, i.e., the reciprocal 1/CR of CR time constant, while $v_0$ and $v_1$ are integration constants determined from a voltage continuation condition on a time axis which will be explained in the following.

Assuming that the output voltage v(t) is continuous at time t=0 when the fourth switching element 14 switches from off to on as illustrated in FIG. 4, the following expression (5) is obtained from the above-mentioned expressions (3) and (4).

[Math. 3]

$$v_0 = Ri_s + v_1 \qquad (5)$$

Assuming that the output voltage v(t) is cyclically continuous while one period of the off state of the fourth switching element 14 and one period of the on state thereof constitute one cycle, i.e., $v(-t_1)=v(t_2)$, the following expression (6) is obtained from the above-mentioned expressions (3) and (4).

[Math. 4]

$$v_0 e^{\sigma t_1} = Ri_s + v_1 e^{-\sigma t_2} \qquad (6)$$

When $v_0$ and $v_1$ are determined from the above-mentioned expressions (5) and (6) taken as simultaneous equations with two unknowns, the following expressions (7) and (8) are obtained.

[Math. 5]

$$v_0 = \frac{1 - e^{-\sigma t_2}}{e^{\sigma t_1} - e^{-\sigma t_2}} Ri_s \qquad (7)$$

$$v_1 = \frac{1 - e^{\sigma t_1}}{e^{\sigma t_1} - e^{-\sigma t_2}} Ri_s \qquad (8)$$

Substituting the above-mentioned expressions (7) and (8) into the above-mentioned expressions (3) and (4), respectively, yields the following expressions (9) and (10) during the respective periods when the fourth switching element 14 is off and on.

[Math. 6]

$$v(t) = \frac{1 - e^{-\sigma t_2}}{e^{\sigma t_1} - e^{-\sigma t_2}} Ri_s e^{-\sigma t} \qquad (9)$$

$$v(t) = Ri_s + \frac{1 - e^{\sigma t_1}}{e^{\sigma t_1} - e^{-\sigma t_2}} Ri_s e^{-\sigma t} \qquad (10)$$

Here, assuming that the output voltage at time $t=t_2$ is $v_2$, the following expression (11) is obtained from the above-mentioned expression (10).

[Math. 7]

$$v_2 = v(t_2) = Ri_s + \frac{1 - e^{\sigma t_1}}{e^{\sigma t_1} - e^{-\sigma t_2}} Ri_s e^{-\sigma t_2} = \frac{(1 - e^{-\sigma t_2})e^{\sigma t_1}}{e^{\sigma t_1} - e^{-\sigma t_2}} Ri_s \qquad (11)$$

The output voltage v(t) illustrated in FIG. 4 is determined from the above-mentioned expressions (9), (10), and (11).

When the capacity value C of the smoothing capacitor is made greater here, its time constant becomes sufficiently longer than one period $t_1+t_2$ of on/off switching of the fourth switching element and is approximated as in the following expression (12).

[Math. 8]

$$\sigma t_1 \ll 1, \sigma t_2 \ll 1 \qquad (12)$$

Then, using an approximate formula $e^x = 1+x$, approximation is made as in the following expressions.

[Math. 9]

$$e^{\sigma t_1} = 1 + \sigma t_1, e^{-\sigma t_2} = 1 - \sigma t_2$$

Applying them into the above-mentioned expressions (9) and (10) yields the following expressions (13) and (14) during the respective periods when the fourth switching element 14 is off and on.

[Math. 10]

$$v(t) = \frac{t_2 - \sigma t_2 t}{t_1 + t_2} R i_s \quad (13)$$

$$v(t) = \frac{t_2 + \sigma t_1 t}{t_1 + t_2} R i_s \quad (14)$$

That is, an output voltage having a triangular waveform is obtained. The bottom value v(0) and top value v(t₂) of the output voltage having a triangular waveform are determined as in the following expressions.

[Math. 11]

$$v(0) = \frac{t_2}{t_1 + t_2} R i_s$$

$$v(t_2) = \frac{t_2 + \sigma t_1 t_2}{t_1 + t_2} R i_s$$

When the capacity value C of the smoothing capacitor is further made greater, σ is approximated by 0, whereby the output voltage waveform asymptotically approaches a constant current value as in the following expression.

[Math. 12]

$$v(t_2) \to v(0) = \frac{t_2}{t_1 + t_2} R i_s$$

Here, coefficient ρ=t₂/(t₁+t₂), which is the ratio of the on period to one cycle of on/off switching of the fourth switching element 14, is referred to as duty cycle of switching. Hence, a desirable output voltage is obtained when the duty cycle of the fourth switching element 14 is controlled.

Next, during a period when the third switching element 13 is on, the first and fourth switching elements 11, 14 are held in the off state as illustrated in FIGS. 3 and 5. The second switching element 12 is subjected to PWM control at 120 kHz, for example. The output voltage waveform during the period when the third switching element 13 is on has a polarity opposite to that of the above-mentioned period when the first switching element 11 is on.

When the first and third switching elements 11, 13 are controlled such as to be alternately turned on/off at 60 Hz, for example, an AC current at 60 Hz is obtained as illustrated in FIG. 5. Changing the above-mentioned duty cycle ρ with time in the PWM control of the second and fourth switching elements 12, 14 yields a sinusoidal AC voltage as illustrated in FIG. 5.

Thus, by switching control of the second and fourth switching elements 12, 14 on the lower arm side at a frequency higher than that of the first and third switching elements 11, 13 on the upper arm side, the inverter 1 of the first embodiment can use switching elements which operate at relatively low speed and are less expensive as the first and third switching elements 11, 13 on the upper arm side. As drive circuits for the first and third switching elements 11, 13 on the upper arm side, an inexpensive structure with relatively low operating speed can be used. Therefore, the inverter 1 of the first embodiment can achieve lower cost.

Meanwhile, using a CMOSFET as a switching element in a bridge circuit is advantageous in that it is easily driven by a clock signal. However, a PMOSFET on the upper arm side is problematic in that it tends to exhibit an operating speed lower than that of an NMOSFET on the lower arm side, thereby making it hard to attain higher speed in switching control using a PWM scheme.

Regarding this problem, the switching element on the upper arm side may also be constituted by an NMOSFET. This is advantageous in that higher speed in switching control by the NMOSFET is easier to achieve. However, this is problematic in that an insulating device such as a photocoupler is necessary in a drive circuit for the NMOSFET on the upper arm side, which impairs easiness in driving the switching element and makes it hard to achieve lower cost.

In contrast, the inverter 1 of the first embodiment is suitable when using a CMOSFET as a switching element and can achieve higher speed in switching control, easiness in driving the switching element, and lower cost.

Second Embodiment

Figure 6:
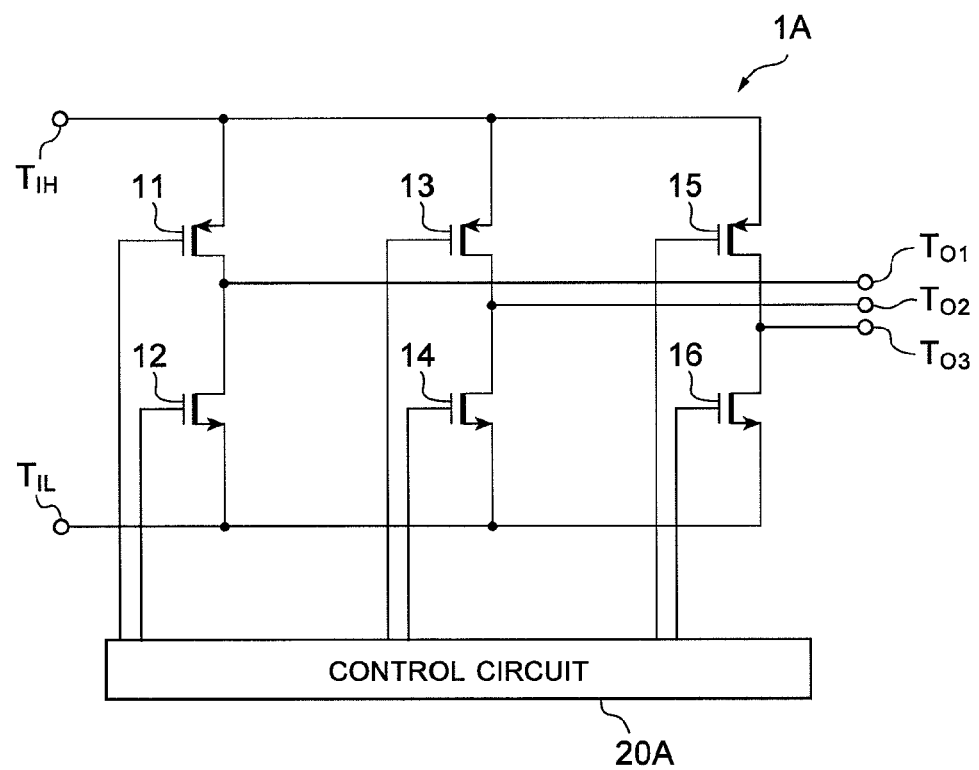
FIG. 6 is a circuit diagram illustrating a single-phase bridge inverter in accordance with a second embodiment of the present invention.

FIG. 6 is a circuit diagram illustrating the inverter in accordance with the second embodiment of the present invention. The inverter (power inverter circuit) 1A of the second embodiment is a three-phase bridge inverter. The inverter 1A converts a DC power fed between a higher-voltage-side input terminal $T_{IH}$ and a lower-voltage-side input terminal $T_{IL}$ into a three-phase AC power among first to third output terminals $T_{O1}, T_{O2}, T_{O3}$. The inverter 1A differs from the inverter 1 of the first embodiment in that it further comprises fifth and sixth switching elements 15, 16 and a control circuit 20A in place of the control circuit 20.

The fifth and sixth switching elements 15, 16 are sequentially connected in series between the higher- and lower-voltage-side input terminals $T_{IH}, T_{IL}$, while their intermediate node is connected to the first output terminal $T_{O3}$. For example, the fifth switching element 15 on the upper arm side is a PMOSFET, while the sixth switching element 16 on the lower arm side is an NMOSFET.

More specifically, the fifth switching element 15 has a source terminal connected to the higher-voltage-side input terminals $T_{IH}$ and a drain terminal connected to a drain terminal of the sixth switching element 16. The sixth switching element 16 has a source terminal connected to the lower-voltage-side input terminals $T_{IL}$. The drain terminals of the fifth and sixth switching elements 15, 16 are connected to the sixth output terminal $T_{O3}$. The fifth and sixth switching elements 15, 16 have gate terminals connected to the control circuit 20A.

The control circuit 20A performs switching control of the first to sixth switching elements 11 to 16. For example, the control circuit 20A alternately turns on a set of the first and fourth switching elements 11, 14, a set of the third and sixth switching elements 13, 16, and a set of the fifth and second switching elements 15, 12 with a phase difference of a ⅓ cycle therebetween, so as to convert a DC current fed between the higher- and lower-voltage-side input terminals $T_{IH}, T_{IL}$ into a three-phase AC power among the first to third output terminals $T_{O1}$ to $T_{O3}$.

More specifically, in a ⅓-cycle period of the output three-phase AC power, the control circuit 20A turns on the first switching element 11, while subjecting the fourth switching element 14 to switching control using a PWM scheme. In another ⅓-cycle period of the output three-phase AC power, the control circuit 20A turns on the third switching element 13, while subjecting the sixth switching element 16 to switching control using the PWM scheme. In still another ⅓-cycle period of the output three-phase AC power, the control circuit 20A turns on the fifth switching element 15, while subjecting the second switching element 12 to switching control using the PWM scheme.

That is, the control circuit 20A subjects the first, third, and fifth switching elements 11, 13, 15 on the upper arm side to switching control at the frequency of the output AC power and the second, fourth, and sixth switching elements 12, 14, 16 on the lower arm side to switching control at a frequency higher than that of the first, third, and fifth switching elements 11, 13, 15 by using the PWM scheme.

By switching control of the second, fourth, and sixth switching elements 12, 14, 16 on the lower arm side at a frequency higher than that of the first, third, and fifth switching elements 11, 13, 15 on the upper arm side, the inverter 1A of the second embodiment can also use switching elements which operate at relatively low speed and are less expensive as the first, third, and fifth switching elements 11, 13, 15 on the upper arm side. As drive circuits for the first, third, and fifth switching elements 11, 13, 15 on the upper arm side, an inexpensive structure with relatively low operating speed can be used. Therefore, the inverter 1A of the second embodiment can also achieve lower cost.

The present invention can be modified in various ways without being restricted to the above-mentioned embodiments. For example, while the embodiments illustrate a mode in which a CMOSFET is used as a switching element, i.e., a PMOSFET and an NMOSFET are used as switching elements on the upper and lower arm sides, respectively, the combination of switching elements on the upper and lower arm sides is not limited to that in the embodiments.

For example, in any type of transistors such as those of IGBT (Insulated Gate Bipolar Transistor) and bipolar types, a switching element which has a conductivity type different from that of the switching element on the lower arm side and an operating speed lower than that of the switching element on the lower arm side may be used as a switching element on the upper arm side. Specifically, N- and P-channel transistors may be used as switching elements on the lower and upper arm sides, respectively.

For example, a switching element which has a structure different from that of the switching element on the lower arm side and an operating speed lower than that of the switching element on the lower arm side may be used as a switching element on the upper arm side. Specifically, a switching element which can operate at relatively high speed may be selected from a group constituted by FETs, IGBTs, bipolar transistors, thyristors, and the like and used as a switching element on the lower arm side, while a switching element having relatively low operating speed and a structure different from that of the switching element on the lower arm side may be selected from a group constituted by FETs, IGBTs, bipolar transistors, thyristors, and the like and used as a switching element on the upper arm side.

For example, a switching element which has a device different from that of the switching element on the lower arm side and an operating speed lower than that of the switching element on the lower arm side may be used as a switching element on the upper arm side. Specifically, a switching element constituted by an SiC device which can operate at relatively high speed may be used as a switching element on the lower arm side, while a switching element constituted by an SiC device having relatively low operating speed may be used as a switching element on the upper arm side.

Though the switching elements on the lower arm side are subjected to switching control at a frequency higher than that of the switching elements on the upper arm side in the embodiments, the switching elements on the upper arm side may be subjected to switching control at a frequency higher than that of the switching elements on the lower arm side.

The switching elements on the upper arm side (i.e., lower speed side), which are not subjected to switching control using the PWM scheme, may be subjected to switching control using the PWM scheme in a half-cycle period of the AC power when the switching elements on the upper arm side are on. Here, the switching frequency on the lower arm side is preferably at least twice as high as the switching frequency of the switching elements on the upper arm side. Preferably, in this case, the switching control on the lower arm side and that on the upper arm side are synchronized with each other.

What is claimed is:

1. A power inverter circuit comprising:

first and second switching elements, sequentially connected in series between input terminals on higher and lower voltage sides, having an intermediate node connected to a first output terminal; and third and fourth switching elements, sequentially connected in series between the input terminals on the higher and lower voltage sides, having an intermediate node connected to a second output terminal;

wherein the power inverter circuit alternatively turns on a set of the first and fourth switching elements and a set of the second and third switching elements so as to convert a DC power fed between the input terminals on the higher and lower voltage sides into an AC power between the first and second output terminals;

wherein the set of the second and fourth switching elements is subjected to switching control at a frequency higher than that of the set of the first and third switching elements;

wherein the first switching element is subjected to switching control using a pulse width modulation scheme while the fourth switching element is subjected to switching control using a pulse width modulation scheme at a frequency at least twice as high as the switching frequency of the first switching element in a half-cycle period of the AC power when the first and fourth switching elements are on; and wherein the third switching element is subjected to switching control using a pulse width modulation scheme while the second switching element is subjected to switching control using a pulse width modulation scheme at a frequency at least twice as high as the switching frequency of the third switching element in the other half-cycle period of the AC power when the second and third switching elements are on.

2. A power inverter circuit comprising:

first and second switching elements, sequentially connected in series between input terminals on higher and lower voltage sides, having an intermediate node connected to a first output terminal;

third and fourth switching elements, sequentially connected in series between the input terminals on the higher and lower voltage sides, having an intermediate node connected to a second output terminal; and fifth and sixth switching elements, sequentially connected in series between the input terminals on the higher and lower voltage sides, having an intermediate node connected to a third output terminal;

wherein the power inverter circuit alternatively turns on a set of the first and fourth switching elements and a set of the second and third switching elements so as to convert a DC power fed between the input terminals on the higher and lower voltage sides into an AC power between the first and second output terminals;

wherein one of the sets of the first and third switching elements and the second and fourth switching elements is subjected to switching control at a frequency higher than that of the other; and wherein the first to sixth switching elements are subjected to switching control such that one of sets of the first, third, and fifth switching elements and the second, fourth, and sixth switching elements is subjected to switching control at a frequency higher than that of the other so as to generate a three-phase AC power among the first to third output terminals.

* * * * *